United States Patent [19]
Anderson et al.

[11] Patent Number: 5,427,528
[45] Date of Patent: Jun. 27, 1995

[54] ACTIVITY TOY AND METHOD OF USING TO FORM ARTWORK

[76] Inventors: Richard H. Anderson, 27181 Parada La., Mission Viejo, Calif. 92691; Robert R. Anderson, P.O. Box 1059, Trabuco Canyon, Calif. 92678

[21] Appl. No.: 65,164
[22] Filed: May 20, 1993
[51] Int. Cl.6 .............................................. G09B 11/00
[52] U.S. Cl. ...................................... 434/83; 434/81; 446/475; 446/145
[58] Field of Search ....................... 434/81, 82, 83, 84; 446/475, 145

[56] References Cited

U.S. PATENT DOCUMENTS

| | | | |
|---|---|---|---|
| 1,458,508 | 6/1923 | Aiken | 434/82 |
| 4,749,347 | 6/1988 | Valavaara | 425/135 |
| 5,044,957 | 9/1991 | Kuranaga | 434/82 |
| 5,297,980 | 3/1994 | Barthold | 446/475 X |

OTHER PUBLICATIONS

"Clay Pictures", Playthings Magazine, Feb. 10, 1960, p. 117 (Advertizement).

Primary Examiner—Gene Mancene
Assistant Examiner—Jeffrey A. Smith
Attorney, Agent, or Firm—Stetina Brunda & Buyan

[57] ABSTRACT

An activity toy for allowing the user to form artworks from a plastic material such as modeling clay, PLAY-DOH, or plasticene has hand-held extruder for dispensing the plastic material, a first plate upon which the plastic material is disposed so as to form the artwork, and a transparent second plate disposable in laminar juxtaposition to the first plate so as to capture the artwork therebetween.

26 Claims, 2 Drawing Sheets

U.S. Patent     June 27, 1995     Sheet 1 of 2     5,427,528
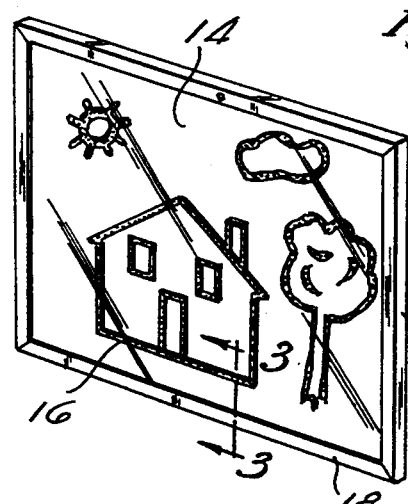
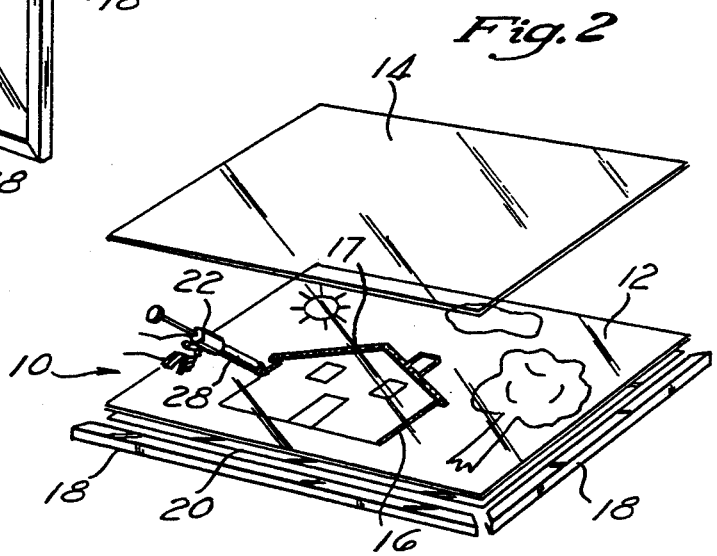
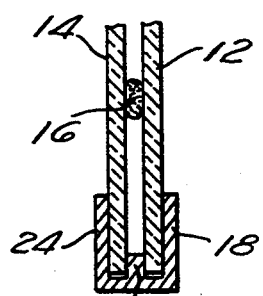
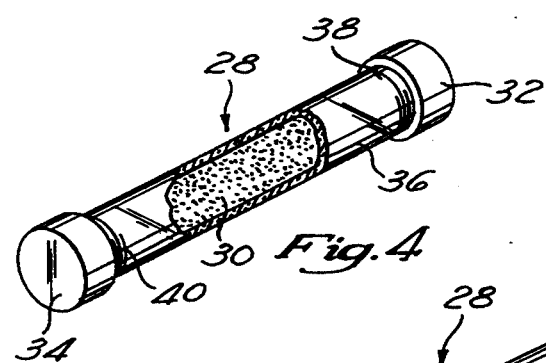
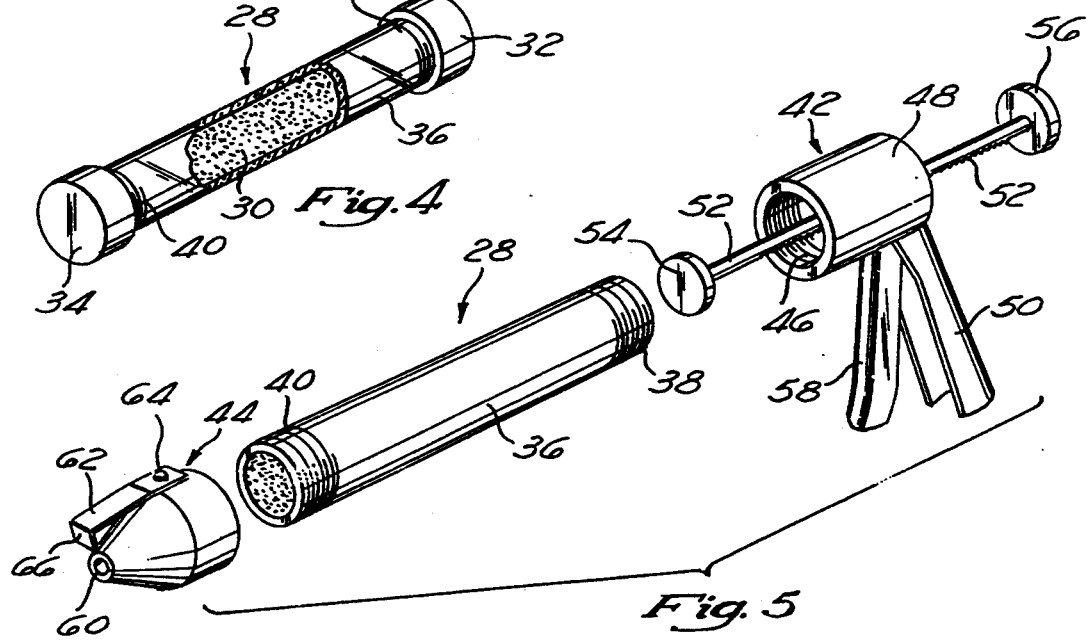

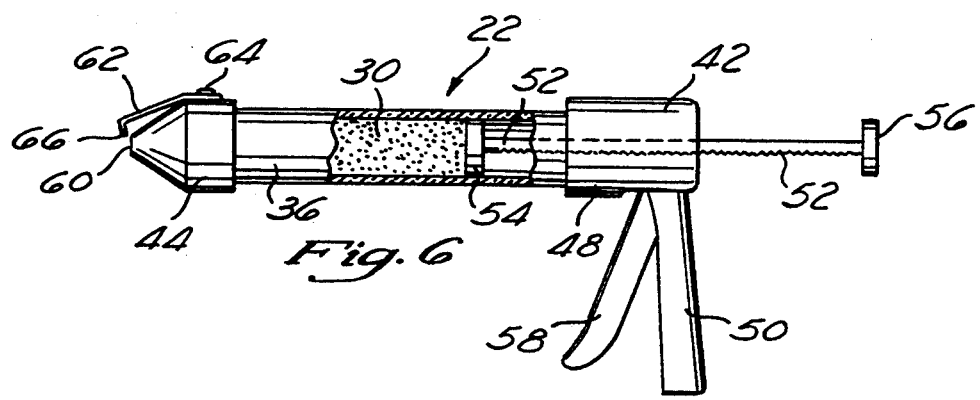
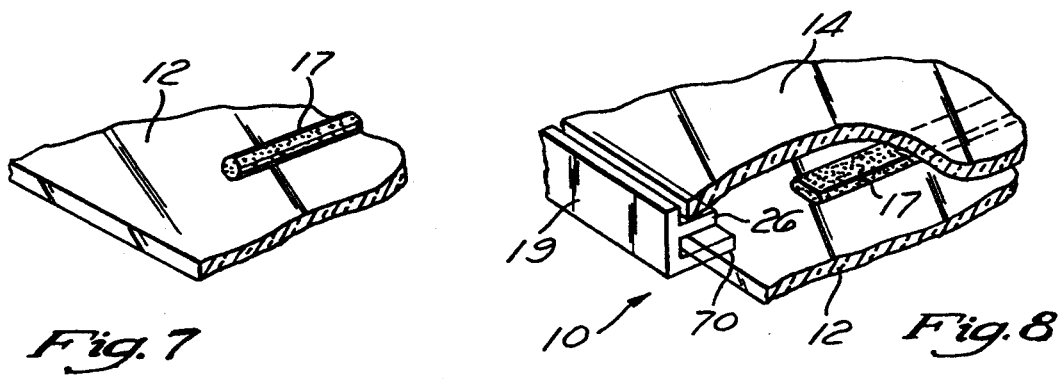
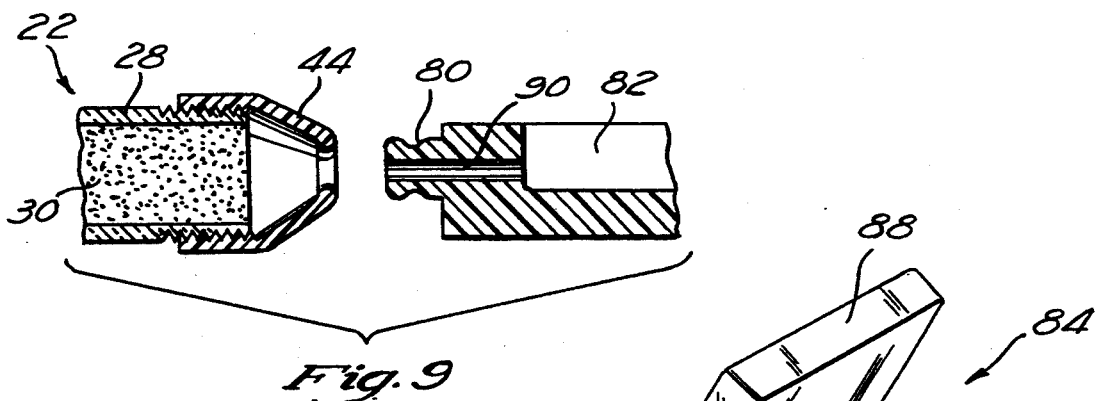
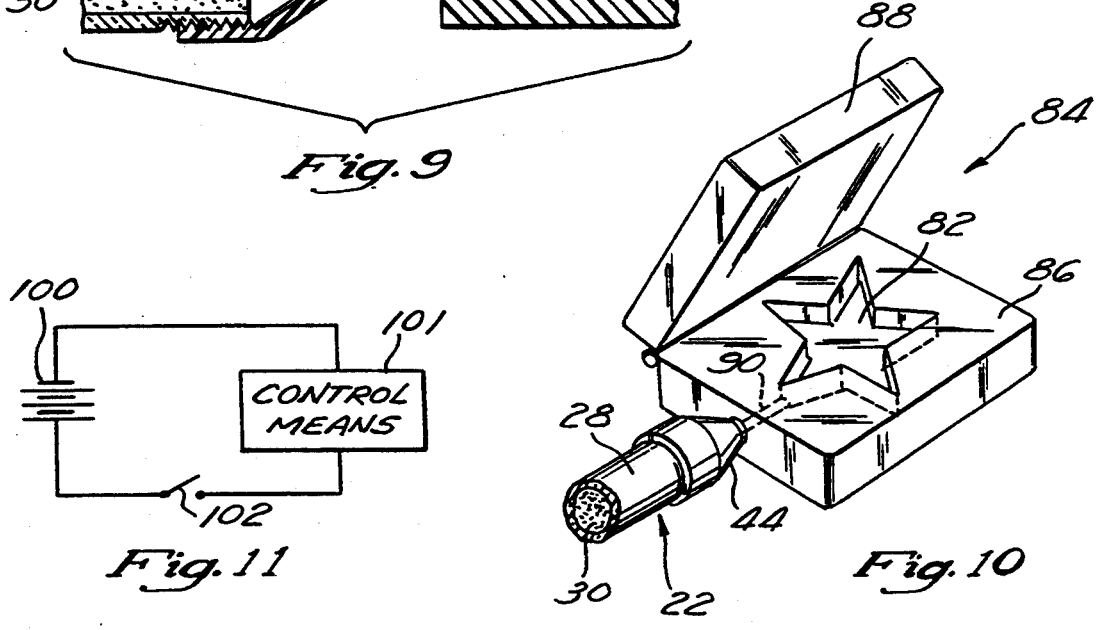
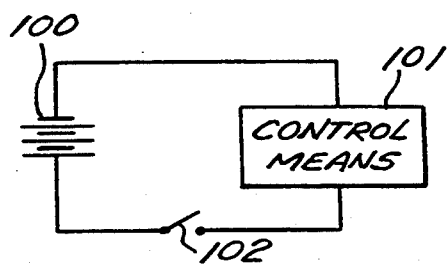

ACTIVITY TOY AND METHOD OF USING TO FORM ARTWORK

FIELD OF THE INVENTION

The present invention relates generally to toys and more particularly to an activity toy with which the user forms artworks from a colored plastic material such modeling as clay, PLAY-DOH (a registered trademark of Tonka Corporation of Pawtucket, R.I.), plasticene or the like, and which may be framed and hung upon the wall in the fashion of a picture.

BACKGROUND OF THE INVENTION

Modeling clay, PLAY-DOH, plasticene, and various other colored plastic materials are well-known. Such plastic materials have commonly been used by children in their play activities. Children typically use their hands to fashion such plastic materials into a wide variety of desirable shapes, i.e., animals, houses, cars, flowers, etc. Different colors of plastic material may be utilized to form the various portions of such items so as to resemble their real counterparts or the colors may be utilized otherwise, as desired, i.e., to form fanciful designs, etc.

For example, green plastic material could be used to form the stalks and leaves of a flower and blue, red, or yellow plastic material used to form the petals thereof. Thus, a child can mold the plastic material so as to form a wide variety of items or artistic designs, as desired.

Various devices for shaping, forming, or molding such plastic materials are also known. For example, U.S. Pat. No. 4,569,815 issued on Feb. 11, 1986 to Rentz et al. and entitled METHOD AND DEVICE FOR SIMULTANEOUSLY PROPELLING AND FORMING IMPRESSIONS WITH A FLOWABLE MATERIAL discloses a toy for extruding and molding various predetermined shapes of PLAY-DOH or the like. In the Rentz device, a lever moves a piston to force the PLAY-DOH or other plastic material either through an extrusion mold or into a mold cavity, so as to form the desired shapes.

It is also known to form artworks utilizing plastic materials. One example of a device utilized to form such artworks is disclosed in U.S. Pat. No. 4,496,510 issued on Jan. 29, 1985 to Hanson et al. and entitled ACTIVITY TOY. With the Hanson device, the user may create needlecraft-like textured designs using a plastic material. Strands of the plastic material supported on a screen simulate the stands or nubs of needlecraft designs. An extruder is positioned adjacent the rear surface of the screen and moved along the screen so as to force plastic material through the screen mesh and thereby create the needlecraft-like texture thereupon.

Although such toys have proven generally suitable for their intended purposes, they possess inherent deficiencies which detract from their overall utility. More particularly, crafts and artworks formed by hand, or by utilizing the Rentz, Hanson, or other such devices, are subject to deterioration and degradation, particularly that caused by handling and exposure to the elements, i.e., dust, dirt, moisture, etc.

The plastic materials utilized in forming such crafts and artworks are typically soft and pliable. The resulting crafts and artworks are therefore subject to being broken and/or deformed during handling subsequent to the formation process.

The plastic materials commonly utilized to form such crafts and artworks are also particularly susceptible to soiling since dust, dirt, etc., coming into contact therewith typically adheres thereto and becomes embedded therein.

Such degradation, deformation, breakage, and/or soiling prevents crafts and artworks formed from such plastic materials from being enjoyed for extended periods of time. As such, although the prior art has recognized to a limited extent the problem of forming crafts and artworks from such plastic materials, the proposed solutions have, to date, been ineffective in providing a satisfactory remedy.

SUMMARY OF THE INVENTION

The present invention specifically addresses and alleviates the above-mentioned deficiencies associated with the prior art. More particularly, the present invention comprises an activity toy for allowing the user to form artworks from a plastic material such as modeling clay, PLAY-DOH, or plasticene and comprises a hand-held extruder for dispensing the plastic material; a first plate upon which the plastic material is disposed so as to form the artwork; and a transparent second plate disposable in laminar juxtaposition to the first plate so as to capture the artwork therebetween.

An attachment means attaches the first and second plates together. The attachment means optionally defines a frame such that the artwork may be displayed in an aestheticly pleasing manner. Thus, an artwork is formed which is protected by the first and second plates and which may thus be displayed and enjoyed for an indefinite period of time without concern regarding handling or exposure to the environment.

A stop, preferably formed upon the attachment means or frame, is configured to define the distance between the first and second plates when the attachment means or frame is attached thereto. The stop preferably defines the distance between the first and second plates to be approximately 0.093 inch. The stop prevents the first and second plates from inadvertently being forced too close together, so as to crush or excessively compress the artwork.

A template, preferably printed upon paper or the like, is optionally positioned beneath the first plate. The first plate is formed to be transparent such that the artwork can be formed thereon by tracing the template with the extruder.

For example, the template may comprise a sheet of paper sized similar to that of the first plate and having the outlines of a house, tree, clouds, and the sun formed thereon. By placing the template beneath the transparent first plate, the indicia formed upon the template can easily be viewed therethrough. Thus, it is a simple matter for a child to trace the outlines formed upon the template with the extruder so as to recreate the outlines upon the first plate, thus forming an artwork. Use of the template thus makes it easy for young children to form artworks upon the first plate. The child is free to utilize various colors, as desired. Optionally, the outlines formed upon the template may be of various different colors so as to provide suggestions for color choices.

The extruder preferably comprises a removable cartridge of plastic material such that a replacement cartridge may be utilized when the extruder is depleted of plastic material. Interchangeable cartridges containing various colors of plastic material are utilized so as to form various portions of the artwork of desired colors.

The extruder comprises a handle configured to be held in a user's hand, a plunger controllably extendable from the handle, and a substantially transparent cartridge having proximal and distal ends and containing the plastic material. The cartridge is attachable at its proximal end to the handle so as to receive the plunger. The control means effects extension of the plunger from the handle and into the cartridge so as to cause the plastic material to extrude therefrom.

The use of a substantially transparent cartridge facilitates viewing of the plastic material contained therein such that a cartridge containing a desired color of plastic material may readily be selected, installed upon the handle, and utilized. By utilizing such a transparent cartridge, the user is not required to search for indicia formed thereupon which indicate the color of the plastic material contained within the cartridge. This is particularly beneficial when the present invention is used by younger children. The use of a substantially transparent cartridge also allows the user to easily determine the quantity of plastic material remaining therein.

The extruder preferably comprises a removable tip disposed at the distal end of the cartridge. The removable tip has an aperture, preferably round, formed therein through which the plastic material is dispensed. The aperture preferably has a diameter of approximately 0.125 inch. Those skilled in the art will recognize that various shapes, configurations, and sizes of apertures are suitable. For example, the aperture may be square so as to form a square bead.

The tip may alternatively comprise an elongate or slit aperture so as to facilitate dispensing of a ribbon of plastic material, thus covering a larger area. Smaller tips may similarly be utilized so as to dispense a thinner bead of plastic material, particularly useful in forming the detail of the artwork. The tip is preferably connected to the cartridge by threading the tip thereon. Those skilled in the art will recognize that various other means i.e., snaps or detents, bayonet connectors, etc., for removably attaching the tip to the cartridge are likewise suitable.

The aperture is optionally configured to engage a complimentary fitting, preferably a zerk-type fitting, so as to facilitate pumping of the plastic material through the fitting. The extruder may thus be utilized to pump plastic material into a mold to form solid crafts. For example, a zerk-fitting formed in a first mold section facilitates flow of the plastic material from the extruder, through the zerk-fitting, and into a cavity defined by first and second mold portions so as to form a desired article.

First threads formed upon the handle and complimentary second threads formed upon the proximal end of the cartridge allow the cartridge to be removably attached to the handle by engaging the first and second threads. Those skilled in the art will recognize that various other means for attaching the cartridge to the handle are likewise suitable.

When the cartridge is attached to the handle, a piston, slidably attached to the handle, is received within the cartridge. A control means, preferably a squeeze-type trigger, urges the piston deeper into the cartridge in a controlled manner to facilitate control dispensing of the plastic material from the cartridge through the aperture formed in the tip. The control means may comprise a mechanical control means or an electrical control means. Batteries may be provided to autonomously operate an electrically controlled extruder.

A cutting means or knife blade is optionally disposed proximate the aperture for cutting the plastic material dispensed therefrom. By using such a knife blade, clean cuts in the dispensed plastic material are formed, thus the amount of plastic material dispensed by the extruder may be precisely controlled so as to form an artwork as desired.

Thus, by utilizing the activity toy of the present invention, a user may form an artwork by extruding at least one plastic material onto a first plate so as to define the artwork. A plurality of different plastic materials, each of a different color, may be utilized to color the artwork as desired. After the artwork is formed, a transparent second plate is disposed in laminar juxtaposition to the first plate so as to capture the artwork between the first and second plates. The extruded plastic material preferably has a diameter of approximately 0.125 inch as it is applied to the first plate and is preferably compressed to a thickness of approximately 0.093 inch as it is captured between the first and second plates. Those skilled in the art will recognize that various other diameters of the extruded plastic material as it is applied and after it is compressed are likewise suitable.

The first and second plates are attached together, preferably via attachment means formed as a frame and having stop means formed thereon such that the first and second plates cannot be moved closer together than 0.093 inch.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a perspective view of an artwork formed according to a first embodiment of the present invention;

FIG. 2 is an exploded view of the artwork of FIG. 1 illustrating use of the extruder to form the artwork, the extruder and artwork not necessarily being drawn to scale;

FIG. 3 is a sectional end view taken along Lines 3 of FIG. 1;

FIG. 4 is a perspective view of a sealed cartridge, broken away to show the plastic material contained therein;

FIG. 5 is an exploded perspective view of the extruder of the present invention;

FIG. 6 is a side view, partially in section, of the extruder of FIG. 5 showing the piston contacting the plastic material contained within the cartridge such that further extension of the piston results in dispensing of the plastic material from the aperture of the tip;

FIG. 7 is an enlarged perspective view of a bead of plastic material formed upon the first plate, prior to compression thereof by the second plate;

FIG. 8 is a perspective view of the bead of plastic of FIG. 7 after it has been compressed by the second plate and also showing the stop disposed intermediate the two plates to prevent further compression of the bead;

FIG. 9 is an enlarged cross-sectional view of a zerk-type fitting and a tip specifically configured to attach thereto, so as to facilitate pumping of the plastic material into a mold cavity according to a second embodiment of the present invention;

FIG. 10 is a perspective view of a mold cavity having the extruder of the present invention attached to a zerk-type fitting so as to facilitate pumping of the plastic material of the cavity of the mold; and FIG. 11 is an electrical block diagram showing a battery operated electrical control means.

DETAILED DESCRIPTION OF THE PREFERRED EMBODIMENTS

The detailed description set forth below in connection with the appended drawings is intended as a description of the presently preferred embodiments of the invention, and is not intended to represent the only forms in which the present invention may be constructed or utilized. The description sets forth the functions and sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The activity toy of the present invention is illustrated in FIGS. 1-10 which depict two presently preferred embodiments thereof.

Referring now to FIGS. 1 and 2, the first embodiment of the present invention is used to form an artwork 10 and comprises a first generally rectangular plate 12, which is preferably transparent, a generally rectangular, transparent second plate 14 which is preferably also transparent and a plastic material 16 disposed intermediate the first 12 and second 14 plates. A frame 18 optionally is disposed about the periphery of the first 12 and second 14 plates so as to attach the first 12 and second 14 plates together in a manner which defines the relative positioning thereof. A template 20 (as shown in FIG. 2) is disposed beneath the first plate 12 such that an extruder 22 may be utilized to trace thereover so as to form the artwork 16.

Referring now to FIG. 3, the frame 18 preferably comprises a U-shaped (in cross-section) attachment means 24 which receives the first 12 and second 14 plates such that they are captured therein. A stop 26 is preferably formed within the U-shaped attachment means 24 such that it is disposed intermediate the first 12 and second 14 plates when the frame 18 is installed. Thus, stop 26 determines the spacing between the first 12 and second 14 plates, thereby limiting compression of the artwork 16 disposed therebetween. The stop 26 may either be formed along the entire length of each section of frame 18, or alternatively may be formed along selected portions thereof.

The frame 18 is preferably formed in a plurality of segments such that it may be installed in a piecemeal fashion about the first 12 and second 14 plates after completion of the artwork 16. The frame 18 may optionally be adhesively bonded about the first 12 and second 14 plates. Alternatively, detents may optionally be formed upon the frame 18 and/or first 12 and second 14 plates to facilitate attachment thereto. Those skilled in the art will recognize that various other means for attaching the frame 18 to the first 12 and second 14 plates are likewise suitable. For example, the frame may optionally be split into separate upper and lower sections which are interconnected via fasteners.

Referring now to FIG. 4, the plastic material is preferably supplied within a cartridge 28 which is removably attachable to the extruder 22. Various cartridges containing plastic material 30 of various colors allow the user to form a wide variety of aesthetically pleasing artworks 16. In the preferred embodiment of the present invention, first 32 and second 34 endcaps are threaded onto the tubular body 36 of the cartridge 28 so as to enclose the plastic material 30 therein. The first endcap 32 threads onto threads 38 formed upon the proximal end of the tubular body 36 and the second endcap 34 similarly threads onto the second threads 40 formed upon the distal end thereof. However, alternative end cap closures are specifically contemplated herein.

Referring now to FIGS. 5 and 6, the first 32 and second 34 endcaps are removed from the cartridge 28 such that the tubular body 36 thereof is attachable to handle 42 and tip 44. The tubular body 36 attaches to the handle 42 via screwing the first threads 38 into corresponding complimentary threads 46 formed within the body 48 of the handle 42. In a similar fashion, the tip 44 is screwed onto the second threads 40 of the tubular body 36.

The handle 42 comprises a handle member 50 configured to be grasped by the user's hand, a plunger 52 extending through the body 48 such that the plunger is received within the tubular body 36 of the cartridge 28 when the cartridge 28 is installed upon the handle 42. A piston 54 is formed upon the distal end of the plunger 52 and a grip 56 is formed upon the proximal end of the plunger 52. A trigger 58 is disposed alongside the handle member 50 such that the trigger 58 may be grasped and pulled toward the handle 58 so as to cause the plunger 52 to extend further into the cartridge 28, thereby extruding the plastic material 30 contained therein out through the tip 44. Those skilled in the art will recognize that various means are suitable for mechanically interconnecting the trigger 58 to the plunger 52 such that extension of the plunger 52 in a controlled manner results from squeezing of the trigger 58. The grip 56 is utilized to withdraw the plunger 52 back toward the body 48 prior to the installation of a new cartridge 28.

The tip 44 comprises an aperture 60 formed in the distal end thereof so as to define the size and shape of the bead extruded from the extruder 22. A knife blade cutter 62 is preferably attached to the tip 44 via rivet 64. The knife blade 62 is comprised of a bent length of spring steel such that it may be pushed with a fingertip over the aperture 60 thereby cutting any plastic material 30 extruded therefrom. The cutting edge 66 need not be sharp due to the ease with which such plastic material is cut and therefore represents no hazard to small children.

A variety of tips 44 having a corresponding variety of sizes and shapes of apertures 60 are preferably provided so as to facilitate the formation of various shapes of beads comprising the artwork 16. The diameter of the aperture 60 is preferably approximately 0.125 inch. For example, a long thin rectangular opening formed as the aperture 60 results in the extrusion of a ribbon of plastic material, whereas a small diameter tip results in the formation of a fine bead of plastic material.

Referring now to FIG. 7, a bead 17 is extruded onto the plate 12 by the extruder 22 so as to define the artwork 16. Although not by way of limitation the bead 17 preferably has a diameter of approximately 0.125 inch.

Referring now to FIG. 8, the bead 17 is first formed upon the first plate 12, and the second plate 14 is then placed in laminar juxtaposition to the first plate 12 after the artwork is completed. The first 12 and second 14 plates are then urged together such that the bead 17 is compressed to have a thickness of approximately 0.093 inch. A stop 26, preferably formed upon a frame 18 may optionally be inserted intermediate the first 12 and second 14 plates prior to compression of the artwork 16 to facilitate compression thereof to the desired thickness of 0.093 inch. The stop 26 may optionally be formed upon a non-frame member 19 which is inserted intermediate the first 12 and second 14 plates only during the compression process. For example, the stop 26 may be formed upon small clips, i.e., approximately 1 inch in length, which grasps the lower plate 12 intermediate a lower member 70 and the stop 26 thereof. The second plate 14 then rests upon the stop 26. Optionally, such a clip may be formed to have the cross-section of the frame member illustrated in FIG. 3 so as to additionally attached first 12 and second 14 plates together. Thus, the first 12 and second 14 plates may be attached together via a frame, via short clips, or only by the adhesion supplied by the plastic material of the artwork 16. Those skilled in the art will recognize the various other means for attaching the first 12 and second 14 plates together are likewise suitable.

Thus, to use the first embodiment of the present invention, the transparent first plate 12 is placed over the template 20 and the extruder 22 is used to form an artwork 16 upon the first plate 12. Various desired colors of plastic material 30 are utilized to form the artwork 16 by interchanging cartridges 28 containing the various colors of plastic material 30 as desired.

To change cartridges 28, the attached cartridge 28 is unscrewed from the handle 42 and the first 32 and second 34 endcaps are preferably replaced thereon. Next, the first 32 and second 34 endcaps are removed from the cartridge 28 to be installed upon the handle 42 and the first threads 38 of the cartridge 28 are threaded into the threads 46 of the handle 48. If necessary, the grip 56 of the plunger 52 is pulled proximally such that it does not undesirably force plastic material 30 from the newly installed cartridge 28. A tip 44 having a desired shape and size of aperture 60 is then threaded onto the threads 41 of the newly installed cartridge 28 and the trigger 58 is then squeezed so as to cause the piston 54 to abut the plastic material 30 contained within the newly installed cartridge 28.

Further squeezing of the trigger 58 effects dispensing of a bead of plastic material 30 as the plastic material 30 is extruded through the aperture 60 of the tip 44.

The knife blade 62 is used as desired to cut the extruded plastic material 30. To use the knife blade 62, the user merely stops squeezing the trigger 58 so as to cease extrusion of the plastic material 30 and then bends the knife blade 62 toward the aperture 60, thereby cutting the extruded plastic material 30.

After completion of the artwork 16, the transparent second plate 14 is placed over the artwork 16 such that the second plate 14 is parallel to and in laminar juxtaposition with the first plate 12. The first 12 and second 14 plates are then urged together, thereby compressing the artwork 16 slightly. In the preferred embodiment of the present invention, the artwork 16 has an original thickness of approximately 0.125 inch and a thickness after compression of approximately 0.093 inch. The use of an optional stop as illustrated in FIG. 8 limits compression of the beads 17 comprising the artwork 16 to the desired thickness.

After compression, the frame 18 is installed about the periphery of the first 12 and second 14 plates such that the finished artwork is suitable for display. The stop 26 formed within the frame 18 prevents further inadvertent compression of the artwork 16.

Referring now to FIGS. 9 and 10, in the second embodiment of the second invention, the tip 44 is configured for attachment to a zerk-type fitting 80 such that plastic material 30 may be pumped by the extruder 22 through the zerk-type fitting 80 and into a cavity 82 of a mold 84. The mold 84 preferably comprises a first 86 mold half within which the cavity 82 is formed and a second mold half 88 which may optionally have a cavity also formed therein.

With particular reference to FIG. 10, the second embodiment of the present invention is utilized by attaching the tip 44 of the extruder 22 to a zerk-type fitting 80 (as shown in FIG. 9). The zerk-type fitting 80 is inserted into opening 60a formed in the tip 44. The zerk-type fitting 80 is attached to a mold 84 such that plastic material 30 extruded or pumped from the extruder 22 flows through bore 90 into cavity 82 of mold 84, thus forming a desired article or craft.

Thus, to use the second embodiment of the present invention, the tip 44 of the extruder 22 is attached to the zerk-type fitting 80 of the mold 84 and the handle 58 of the extruder 22 is squeezed so as to fill the cavity 82 of the mold 84 with plastic material 30. The mold 84 is then opened by separating the first 86 and second 88 halves thereof and the plastic material disposed in the cavity 82 of the mold 84 is removed therefrom.

Referring now to FIG. 11, the control means optionally comprises an electrical control means 101 responsive to switch 102. Battery 100 provides electrical power to the electrical control means 101.

It is understood that the exemplary activity toy and method for using the same described herein and shown in the drawings represents only the presently preferred embodiments of the invention. Indeed, various modifications and additions may be made to such embodiments without departing from the spirit and scope of the invention. For example, the shape of the first 12 and second 14 plates need not be rectangular as described and illustrated, but rather may be of any shape, i.e., triangular, octagonal, hexagonal, circular, oval, etc., as desired.

Also, rather than being transparent, the tubular body 36 of the cartridge 28 may optionally comprise a label representative of the color of plastic material 30 contained therein. Alternatively, only a portion of the cartridge 28 may be formed of a transparent material, so as to allow the user to view the contents thereof. Thus, these and other modifications and additions may be obvious to those skilled in the art and may be implemented to adapt the present invention in a variety of different applications.

What is claimed is:

1. A toy comprising, in combination:
   (a) an extruder for dispensing a plastic material;
   (b) a first plate upon which the plastic material is positionable to form an artwork; and
   (c) a transparent second plate disposable in laminar juxtaposition to said first plate so as to capture the artwork therebetween.

2. The toy as recited in claim 1 further comprising attachment means attachable to said first and second plates for attaching said first and second plates together.

3. The toy as recited in claim 2 wherein said attachment means defines a frame.

4. The toy as recited in claim 2 wherein said attachment means comprises a stop configured to define the distance between said first and second plates when said attachment means is attached thereto.

5. The toy as recited in claim 4 wherein said stop defines the distance between said first and second plates to be approximately 0.093 inch.

6. The toy as recited claim 1 further comprising:
(a) a template; and
(b) wherein said first plate is substantially transparent such that the artwork can be formed by tracing the template with the extruder when the template is disposed beneath the first plate.

7. The toy as recited in claim 1 wherein said extruder comprises a removable cartridge of plastic material.

8. The toy as recited in claim 1 wherein said extruder comprises a plurality of interchangeable cartridges of plastic material, each cartridge containing plastic material of a different color.

9. The toy as recited in claim 1 wherein said extruder comprises:
(a) a handle configured to be held in a user's hand;
(b) a plunger controllably extendable from said handle;
(c) a cartridge, at least a portion of which is substantially transparent, having proximal and distal ends and containing the plastic material, removably attachable at its proximal end to said handle so as to receive said plunger;
(d) control means for effecting extension of said plunger from said handle and into said cartridge so as to cause the plastic material to extrude from the cartridge; and
(e) wherein the color of said plastic material is ascertainable by viewing the plastic material through said cartridge.

10. The toy as recited in claim 9 wherein said extruder further comprises a removable tip disposed at the distal end of said cartridge, said removable tip having an aperture formed therein through which the plastic material is dispensed.

11. The toy as recited in claim 10 wherein said aperture has a diameter of approximately 0.125 inch.

12. The toy as recited in claim 10 herein said extruder further comprises cutting means disposed proximate said aperture for cutting the plastic material dispensed therethrough.

13. The toy as recited in claim 10 wherein said aperture is configured to engage a complimentary fitting so as to facilitate pumping of the plastic material through the fitting.

14. The toy as recited in claim 10 wherein said aperture is configured to engage a zerk-type fitting.

15. The toy as recited in claim 9 wherein said extruder further comprises:
(a) first threads formed upon said handle;
(b) complimentary second threads formed upon the proximal end of said cartridge; and
(c) wherein said cartridge is removably attachable to said handle by engaging said first and second threads.

16. The toy as recited in claim 9 wherein said control means comprises a mechanical control means.

17. The toy as recited in claim 9 wherein said control means comprises an electrical control means.

18. The toy as recited in claim 9 wherein said extruder further comprises a battery to provide an electrical power source for operating said control means.

19. A method for forming an artwork said method comprising the steps of:
(a) extruding plastic material onto a first plate so as to define the artwork; and
(b) disposing a transparent second plate in laminar juxtaposition to said first plate so as to capture the artwork between said first and second plates.

20. The method as recited in claim 19 further comprising the step of attaching said first and second plates together.

21. The method as recited in claim 19 further comprising the step of stopping said first and second plates so as to limit the distance that they are movable toward one another.

22. The method as recited in claim 19 wherein the step of extruding plastic material comprises tracing a template through a transparent first plate.

23. The method as recited in claim 19 wherein the step of extruding plastic material comprises extruding a plurality of colors of plastic materials.

24. The method as recited in claim 19 wherein the step of extruding the plastic material comprises extruding a plastic material having a diameter of approximately 0.125 inch.

25. The method as recited in claim 19 wherein the step of disposing a second plate in laminar juxtaposition to said first plate comprises compressing the artwork.

26. The method as recited in claim 19 wherein:
(a) the step of extruding the plastic material comprises extruding a plastic material having a diameter of approximately 0.125 inch; and
(b) the step of disposing a second plate in laminar juxtaposition to said first plate comprises compressing the artwork to a thickness of 0.093 inch.

* * * * *